United States Patent
Wilkes et al.

(10) Patent No.: US 7,061,272 B2
(45) Date of Patent: Jun. 13, 2006

(54) FINITE STATE MACHINE CIRCUIT

(75) Inventors: Dyson Wilkes, Marlborough (GB);
Kostas Spyridis, Swindon (GB)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/881,130

(22) Filed: Jun. 30, 2004

(65) Prior Publication Data

US 2005/0140390 A1    Jun. 30, 2005

(30) Foreign Application Priority Data

Aug. 18, 2003  (GB) ................... 0315850.8

(51) Int. Cl.
*H03K 19/173*   (2006.01)
(52) U.S. Cl. .................. 326/46; 326/37; 326/40
(58) Field of Classification Search ............ 326/37–38, 326/40, 46, 93
See application file for complete search history.

(56) References Cited

U.S. PATENT DOCUMENTS

| | | | |
|---|---|---|---|
| 4,390,969 A * | 6/1983 | Hayes | 375/359 |
| 5,125,098 A | 6/1992 | Burrows | |
| 6,803,787 B1 * | 10/2004 | Wicker, Jr. | 326/46 |

FOREIGN PATENT DOCUMENTS

| WO | 94/01953 | 1/1994 |
|---|---|---|
| WO | 98/26348 | 6/1998 |

* cited by examiner

*Primary Examiner*—Anh Q. Tran
(74) *Attorney, Agent, or Firm*—Fish & Richardson P.C.

(57) ABSTRACT

A finite state machine (FSM) circuit including a random access memory (RAM) as the basic logical element and a multiplexer, which can be programmed to perform arbitrary sequences of events. The RAM is used as a state table and output states are fed back to determine the next memory location. The number of locations in the RAM is reduced in comparison with prior art devices, which minimises power consumed by a microprocessor implementing such an FSM. This reduction in the number of locations is possible because only relevant inputs to the RAM are selected. The circuit has both synchronous and asynchronous implementations.

8 Claims, 3 Drawing Sheets

FINITE STATE MACHINE CIRCUIT

RELATED APPLICATIONS

This application claims priority from British Patent Application No. 0315850.8, filed Jul. 7, 2003, the contents of which are incorporated herein by reference.

TECHNICAL FIELD OF THE INVENTION

The present invention relates to sequential control functions in digital circuits, and in particular to finite state machine (FSM) circuits.

BACKGROUND

Digital processing devices generally utilise FSM circuits where sequential control is required. A typical synchronous FSM circuit consists of several flip-flops which function to hold the previous state, and several decoding logic gates which function to determine the present state. The output state signal from such an FSM circuit is dependent upon both the previous and present state at the time the flip-flops are clocked. Such a known 'hard-wired' FSM circuit is limited in the range of functions that can be performed because the control function of the FSM is fixed, i.e. each time the circuit in a particular state receives a certain input, then the output state signal will be the same.

In order to enable an FSM to perform a greater range of functions, it is known in the art to implement an FSM as a set of instructions for a microprocessor. FIG. 1 illustrates a known programmable FSM circuit 10 comprising a programmable logical array (PLA) 12 as the basic logical element. A first input to the PLA 12 is an external input line 14 and a second input to the PLA 12 is the state register output line 16. A first output from the PLA 12 is an output line 18 and a second output from the PLA 12 is a state register input line 20. The state register 22 has a single output line 24 which divides in two routes, a first route 26 is coupled to another part of the system of which the FSM is a sub-section and a second route is the state register output line 16.

In operation, an input signal on the external input line 14 is fed into the PLA 12 and the state is input to the state register 22 on the state register input line 20. This state is temporarily stored in the state register 22. When a new clock cycle commences, the PLA 12 receives two inputs, a further input signal on the external input line 14 and the state signal representing the previous state of the FSM from the state register output line 16. The PLA acts on these inputs and outputs a data signal to the output line 18 and the state register input line 20.

U.S. Pat. No. 4,675,556 discloses an example of a programmable FSM circuit which utilises a PLA as the basic logical element. The decoding of input signals and state signals is performed using a table of values stored in a memory in the microprocessor. However, the use of a microprocessor to implement an FSM results in higher power consumption than a hard-wired FSM.

U.S. Pat. No. 5,584,021 describes a programmer, which utilises a memory (for example a RAM) as the basic logical element. The programmer changes state during time intervals, and the memory has a start location containing a start time interval for an output signal and an end location containing an end time interval for the output signal, and further comprises means for reading the values in the locations, and a controller for determining the operation of the means for reading the values.

SUMMARY

The present invention seeks to provide a FSM circuit which can be programmed to perform an arbitrary sequence of events, such that the power consumption of the device is minimised.

According to a first aspect of the present invention, there is provided a finite state machine, comprising:
- a memory device for providing outputs which depend on the inputs to the memory device;
- means for receiving input values; and
- a multiplexer for selecting a subset of the received input values based on an output of the memory device;
- wherein the outputs of the memory device form the outputs of the finite state machine and the present state of the finite state machine, and
- wherein the present state of the finite state machine and said selected subset of the received input values define the inputs to the memory device.

This has the advantage that the size of the memory device can be kept relatively small, since only addresses which correspond to selected combinations of inputs are used.

It should be emphasised that the term "comprises/comprising" when used in this specification is taken to specify the presence of stated features, integers, steps or components but does not preclude the presence or addition of one or more other features, integers, steps, components or groups thereof.

DETAILED DESCRIPTION

Figure 1:
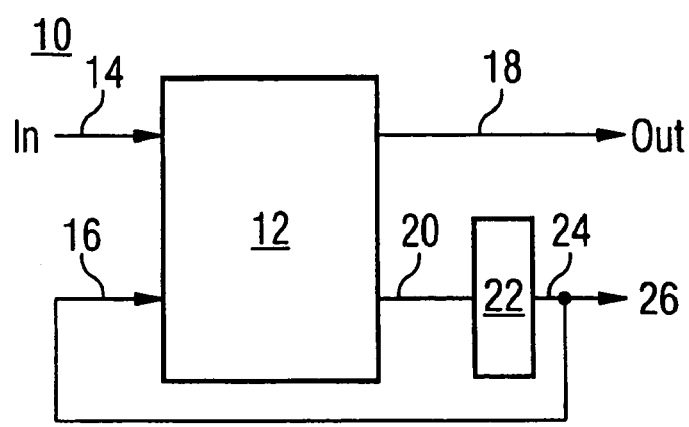
FIG. 1 is a schematic diagram of a prior art FSM circuit based on a PLA.
Figure 2:
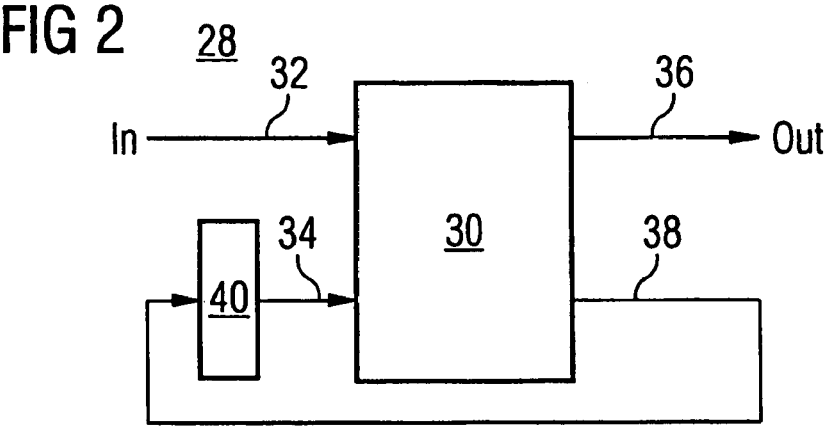
FIG. 2 is a schematic diagram of an FSM circuit in accordance with a first embodiment of the present invention.

In the FSM circuit 28 of FIG. 2, a RAM 30 is the basic logical element. A first input to the RAM 30 is an external input line 32 and a second input to the RAM 30 is an output line 34 of a state register 40. A first output from the RAM 30 is an output line 36 and a second output from the RAM 30 is a state register input line 38, which provides the present state output to the state register 40.

In operation, an input signal on the external input line 32 is fed into the RAM 30 and the present state is input to the state register 40 on the state register input line 38. The state is temporarily stored in the state register 40. When a new clock cycle commences, the RAM 30 receives two inputs, a further input signal on the external input line 32 and the state signal representing the previous state of the FSM from the state register output line 34. In combination, these inputs determine an address location within the RAM 30. Data stored at the particular address location comprises a new present state signal, which is output on the state output line 38, and an output signal, which is output on the output line 36.

Consider an FSM circuit, similar to the circuit of FIG. 2, which has eight input lines and eight output lines. Where there is a requirement for four bits to define the state signal, the RAM 28 would have $2^{12}$ address locations, each storing a 12 bit output, and so would comprise an array of approximately 49200 locations.

Figure 3:
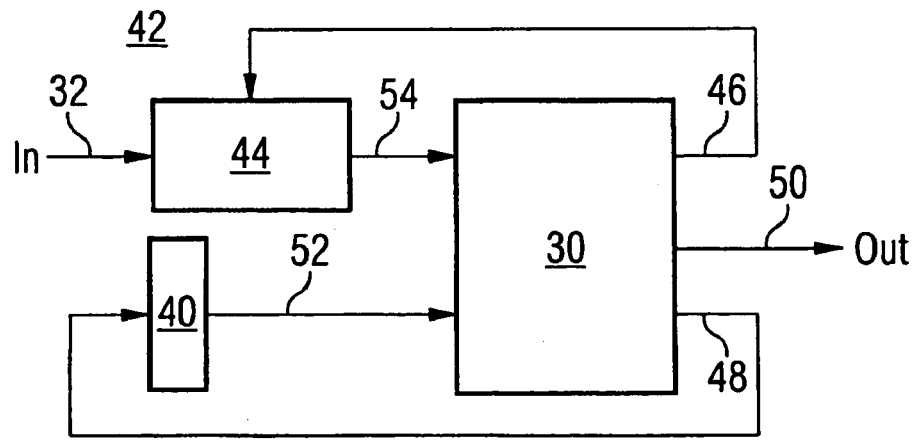
FIG. 3 is a schematic diagram of an FSM circuit in accordance with a second embodiment of the present invention.

FIG. 3 is a schematic diagram of an FSM circuit 42 and in this embodiment, and subsequent embodiments, common reference numerals have been employed where common circuit elements have the same function as in other embodiments described herein. In this second embodiment, modification is found in the addition of a multiplexer 44.

This embodiment takes advantage of the fact that, in any given state of the device, not all of the input bits will have an effect on the output or the state of the device. Therefore, depending on the state of the device, only some of the input bits are used to define addresses in the memory.

An input line 32 is coupled to the multiplexer 44 which has a multiplexer output 54 coupled to a RAM 30. The RAM 30 has three output lines: a first RAM output line 46 is fed back to the multiplexer 44, a second RAM output line 48 is fed into a state register 40 and a third RAM output line is the FSM output line 50. Further, a state register output line 52 is coupled to the RAM 30.

In operation, an N-bit input signal is received on input line 32. Based on an S-bit control data signal received on the feedback line 46, the multiplexer 44 functions to select R bits from the N input bits. When a new clock cycle commences, the RAM 30 receives two inputs, an R-bit input signal on the multiplexer output 54 and an M-bit state signal, representing the previous state of the FSM, on the state register output line 52. In combination, these inputs determine an address location within the RAM 30. Data stored at the particular address location comprises the new state signal M which is output on the state register input line 48, the control data signal S which is output on the first RAM output line 46, and an output signal O, which is output on the FSM output line 50.

In the embodiment of the present invention illustrated in FIG. 3, the length of the control data signal S determines the number of extra memory bits required at each address location, but the use of the multiplexer greatly reduces the number of required addresses. The total number of memory locations is represented by:

$$2^{(R+M)}(O+M+S)$$

Further, the number of permutations, C, of the R from N address bits is represented by $$C=N!/((N-R)!*R!)$$

It will be apparent to the skilled person that C is maximised in the present embodiment when the width of the multiplexer output signal is R=N/2. In such an example, the width of the control data signal S is log2(C) rounded up to the next integer and is always less than $2^N$. Further, if the control data signal S is set to one then it is clear which of the N address bits, input on input line 32, are relevant.

Therefore, the second embodiment of the present invention reduces the number of locations needed in the RAM 30 in comparison to the first embodiment of the present invention. This is achieved through the use of the multiplexer 44. For example, if the multiplexer 44 functions to reduce R by a factor of two, then the number of locations required in the RAM (and, hence, the size of the RAM) is reduced by $2^{N/2}$.

Consider an FSM circuit, similar to the circuit 42 of the second embodiment, which has eight input lines and eight output lines. Where there is a requirement for four inputs bits in order to determine the state signal M, the control data signal S and the output signal O, in that case the control data signal S would be 8 bits wide, and the RAM 30 would comprise an array of 5120 locations.

Figure 4:
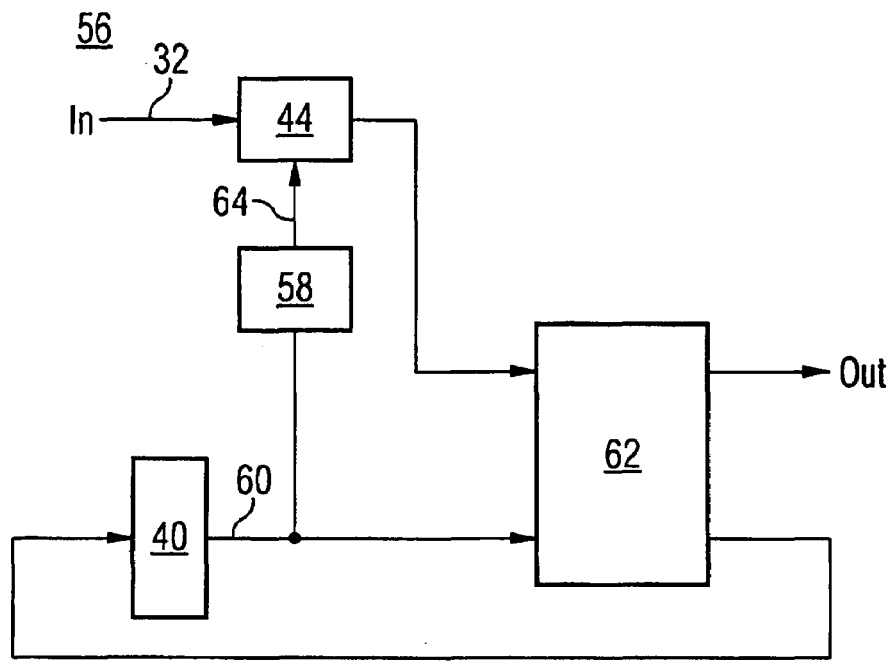
FIG. 4 is a schematic diagram of an FSM circuit in accordance with a third embodiment of the present invention.

FIG. 4 is a schematic diagram of an FSM circuit 56. In this third embodiment modification is found in the addition of a second RAM 58 which has an input coupled to the output 60 of the state register 40. An output 64 of the second RAM 58, a control data signal S, is fed into multiplexer 44. The second RAM 58 stores a table defining the inputs which are to be selected from the N-bit wide signal on the input line 32 to form the R-bit wide input to the RAM 62. This data was in effect stored in the RAM 30 itself in the FSM of the first and second embodiments. Thus, the first RAM 62 can be reduced in size in comparison to the equivalent circuit element, the RAM 30, of previous embodiments.

The embodiment shown in FIG. 4 operates in a similar manner to the embodiment of FIG. 3, although the second RAM 58 functions to convert the state signal M into the control data signal S.

Again, consider an FSM circuit, similar to the circuit 56 of the third embodiment, which has eight input lines and eight output lines. Where there is a requirement for four inputs in order to determine the state signal M and the output signal O, and the control data signal S is 8 bits wide, the first RAM 62 would comprise an array of $2^{(R+M)}(O+M)$, that is 3072 locations, and the second RAM 58 would comprise an array of $2^M.S$, that is 128 locations. This would therefore significantly further reduce the memory requirement.

Figure 5:
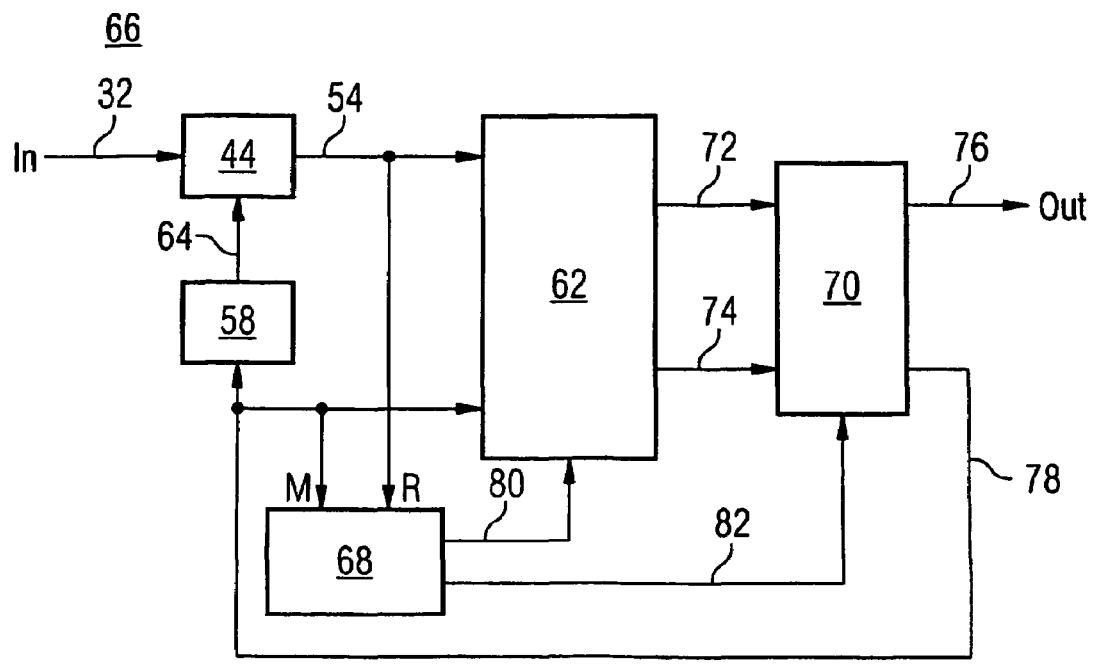
FIG. 5 is a schematic diagram of an FSM circuit in accordance with a fourth embodiment of the present invention.

FIG. 5 is a schematic diagram of an FSM circuit 66, which operates asynchronously, that is, without a clock input. In this fourth embodiment, modification is found in the addition of a control block 68 and a latch 70, whilst the FSM circuit 66 does not include a state register. An input line 32 is coupled to a multiplexer 44, which has a single multiplexer output 54 coupled to a first RAM 62 and also control block 68. The first RAM 62 has two output lines, namely an output enable line 72 and a state output line 74. Both the output enable line 72 and the state output line 74 carry the 'next state' signal into the latch 70. In turn, the latch 70 has a first output line 76 which carries the FSM output signal. A second output line 78, which carries the 'current state' signal, is coupled to the first RAM 62 and a second RAM 58, and the control block 68. The control block 68 has a first output 80 which is fed back as a control input to the first RAM 62 and a second output 82 which is fed back as a control input to the latch 70.

The FSM circuit 66 of FIG. 5 operates in an approximately similar manner to the circuits of previous embodiments. However, due to the absence of a clock signal, it is necessary to minimise the likelihood of 'race conditions' occurring. This is achieved by the introduction of the control block 68 and the latch 70 which ensure that an output from the first RAM 62 is only fed back to its input when a 'next state' signal on the output enable line 72 has a valid value.

As previously, the multiplexer 44 functions to select R from N inputs according to a control data signal S, which is input to the multiplexer on control input line 64. The first RAM 62 receives the input signals, R and M which, in combination, define an address location and thus an output enable signal. Following a change in the value of either of the input signals R and M, there is a period during which the output enable signal stabilises at the intended value. During this stabilisation period, the output signal may temporarily take invalid values, and so, during this period, the latch 70 functions to avoid any signals being fed back to the first RAM 62, since such signals could cause the FSM circuit 66 to unintentionally change state.

Specifically, when the latch 70 is in an 'open' condition, data received at the inputs 72, 74 of the latch 70 is passed to the outputs 76, 78 of the latch 70. When the latch 70 is in a 'closed' condition, data received at the inputs 72, 74 of the latch 70 is not acted upon and the outputs 76, 78 of the latch 70 remain unchanged. The latch is only enabled when a new, valid output enable signal is received on the control line 82.

Clearly, the relative timing of the functioning of respective elements is of importance to the correct functioning of this fourth embodiment of the present invention. Therefore, FIGS. 6 and 7 will now be described to allow a better understanding of the operation of the fourth embodiment.

Figure 6:
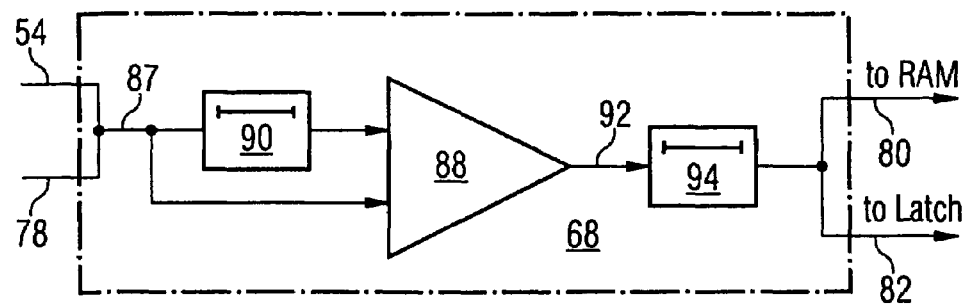
FIG. 6 is a detailed schematic diagram of the control block of the fourth embodiment.

FIG. 6 schematically illustrates the control block 68. The input lines 54, 78, carrying the inputs which are supplied to the first RAM 62, are combined into a single line 87. This single line 87 is coupled firstly to glitch removal circuitry (not shown) of a type which will be known to a person skilled in the art. The resulting filtered signal is then connected to a first input of a comparator 88 via a first delay element 90. Also, the combined line 87 is coupled directly into a second input of the comparator 88. A single output 92 from the comparator 88 is fed into a second delay element 94, which also has the function of filtering out any potential glitches, or any short-lived apparent address changes. The single output from the second delay element 94 is divided into two lines 80, 82, which form inputs for the first RAM 62, and for the latch 70 respectively.

The first and second delay elements 90, 94 preferably comprise simple RC (resistor-capacitor) circuits, of a type which will be well known to the person skilled in the art.

Figure 7:
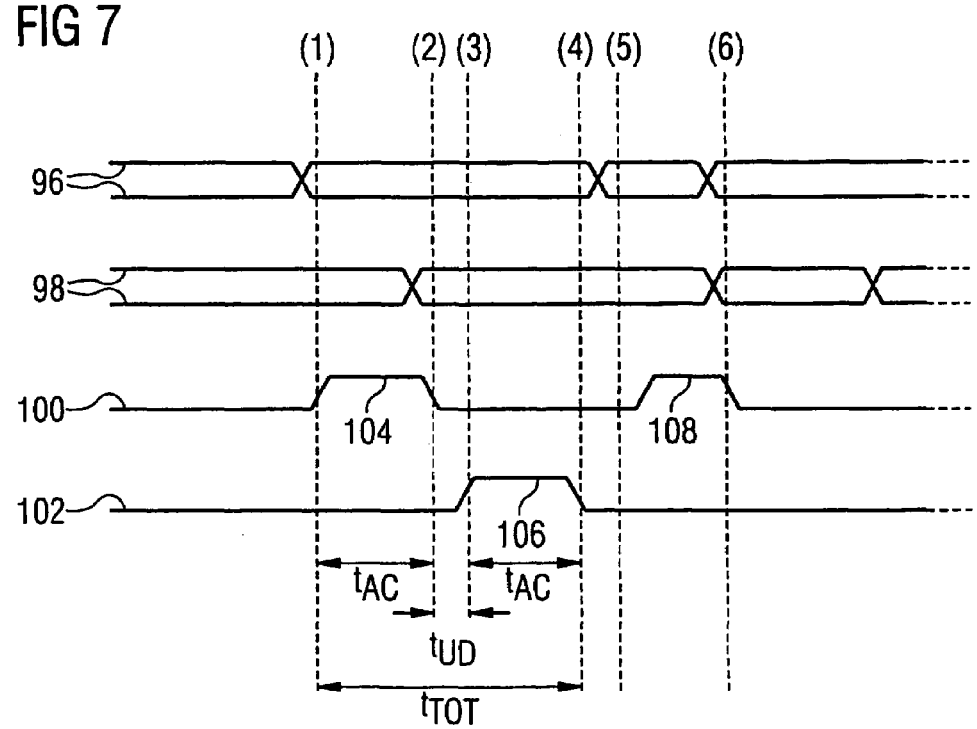
FIG. 7 shows a graph of the relative timing of several signal changes within the FSM circuit of the present invention.

The relative timing of the operation of the elements in the fourth embodiment of the present invention is illustrated in the graph of FIG. 7. A first time line 96 represents the signals input into the control block 68 on the combined line 87, namely the address signal R, provided by the multiplexer 44, and the state signal M, provided by the first RAM 62. A second time line 98 represents a signal output from the first delay element 90 and a third time line 100 represents a signal output from the comparator 88. A fourth time line 102 represents a signal output from the second delay element 94.

As shown in FIG. 7, at point (1) in the operation of the circuit, there is a change in the signal on line 87, resulting from a change either in the input signal R or the state signal M.

At time point (2), a corresponding change occurs in the value of the signal on the output of the delay element 90. Time point (2) occurs later than time point (1) by a set delay period $t_{AC}$, which is determined by the properties of the delay element 90. Between time points (1) and (2), there results a non-uniformity between the two inputs of the comparator 88 in the control block 68 and therefore the comparator output signal 100 changes to logic 1.

At time point (2), when the change occurs in the value of the signal on the output of the delay element 90, the two input signals of the comparator 88 become equal once more, and therefore the comparator output signal 100 becomes equal to logic 0 again.

The comparator output signal 100 therefore contains a pulse 104 of duration equal to the set delay period $t_{AC}$.

The comparator output signal is passed to the second delay element 94, which introduces a second set delay period. As can be seen in FIG. 7, the output of the second delay element 94 contains a pulse 106. In this case, the second delay element 94 introduces a second set delay period which is longer than the first set delay period $t_{AC}$ by a user definable margin $t_{UD}$. Thus, the pulse 106 begins at time point (3), which is a time $t_{UD}$ later than the end of the pulse 104 at time point (2). The pulse 106 ends at time point (4), and therefore has a duration $t_{AC}$, which is equal to the duration of the pulse 104.

The pulse 106 is supplied on line 80 to the RAM 62, and on line 82 to the latch 70. The RAM 62 is designed to be 'active high', and so it is enabled by the leading edge of the pulse 106. The latch 70 is 'active low', and so is triggered by the falling edge of the pulse 106.

This means that, for the time period $t_{AC}$ after the RAM 62 is enabled, its output signal is not passed to the FSM output. This has the effect that any spurious signals from the RAM 62, before its output has stabilised, are not passed by the latch 70. The set delay period $t_{AC}$ can therefore be chosen such that it is at least equal to this memory access time, which is a parameter specified by RAM manufacturers.

Thus, the total latency, from a change in one of the signals R or M, until a change in the circuit output is:

$$t_{TOT} = t_{UD} + 2 * t_{AC}$$

The circuit 68 also acts to ensure that any glitches, which take the form of temporary changes in the address input to the RAM 62, have no effect.

FIG. 7 shows a situation where a temporary address input change (also known as a 'glitch') occurs at time point (5), and lasts until time point (6). In this case, as described above, the inputs to the comparator 88 become unequal at time point (5), and so there is a rising edge in the signal 100 at the output of the comparator 88. However, in this case, since the address change is only temporary, the inputs to the comparator become equal again after a short time, and so the resulting pulse 108 in the signal 100 has a relatively short duration.

The second delay element 94 can be designed such that input pulses, which have durations shorter than a threshold, are filtered out. Specifically, where the second delay element 94 has an RC (resistor-capacitor) configuration, it is the RC time constant that is indicative of the time pulse duration which is required to ensure a complete state transition. In this illustrative example, the pulse 108 has a duration which is shorter than this threshold, and so no corresponding pulse appears in line 102 at the output of the second delay element 94.

While glitches can be filtered out by the second delay element 94 within the control block 68, alternatively or additionally, dedicated circuitry can perform this function. Such circuitry may be located at the input to the control block 68.

As described above, the illustrated embodiments of the present invention define the FSM circuit output values as a function of the state, and define the input values as part of the memory programming. Thus, the output values can change without the state of the FSM changing. Advantageously, more than one path from a first state to a second state can be programmed where each affects a different set of output values.

It will be apparent to the skilled person that the above described circuit architectures are not exhaustive and variations on these structures may be employed to achieve a similar result whilst employing the same inventive concept. For example, an asynchronous FSM is envisaged, wherein a change of state event occurs when the inputs change as opposed to when the clock cycle commences. Alternatively, in the case where the output value for a new state is present when that state is entered, a change of state event in the asynchronous FSM can be triggered by a delay.

Further, the FSM can be an FSM which effectively re-programmes itself for use in adaptive control applications. Alternatively, a separate controller can be included within the circuit to re-program the FSM. It is envisaged that several such FSMs could be combined into a single interacting system of increased complexity.

It can therefore be seen that the present invention provides an FSM circuit which has significant advantages over conventional devices.

The invention claimed is:

1. A finite state machine, comprising:
   a memory device for providing outputs which depend on inputs to the memory device;
   a device configured to receive input values;
   a multiplexer for selecting a subset of the input values based on an output of the memory device;
   a latch, connected to the output of the memory device, the latch being configured to allow the outputs of the memory device to be read only after a predetermined delay following any change in the inputs to the memory device; and
   a control circuit, the control circuit being adapted to trigger a change in the outputs of the memory device following a change in the inputs to the memory device, and to enable the latch after said predetermined delay;
   wherein the outputs of the memory device form the outputs of the finite state machine and a present state of the finite state machine, and
   wherein the present state of the finite state machine and the selected subset of the received input values define the inputs to the memory device.

2. The finite state machine of claim 1, wherein the outputs of the memory device include at least one bit supplied to the multiplexer for selecting said subset of the received input values.

3. The finite state machine of claim 1, further comprising a second memory device, configured to receive the present state of the finite state machine as an input, and configured to supply an output based on the input, wherein the output of the second memory device is supplied to the multiplexer for selecting said subset of the received input values.

4. The finite state machine of claim 1, further comprising a state register for storing the present state of the finite state machine.

5. A signal processing element comprising:
   a finite state machine, including:
      a memory device for providing outputs that depend on inputs to the memory device;
      a device configured to receive input values;
      a multiplexer for selecting a subset of the input values based on an output of the memory device;
      a latch connected to the output of the memory device, the latch being configured to allow the outputs of the memory device to be read only after a predetermined delay following any change in the inputs to the memory device; and
      a control circuit, the control circuit being adapted to trigger a change in the outputs of the memory device following a change in the inputs to the memory device, and to enable the latch after said predetermined delay;
   wherein the outputs of the memory device form the outputs of the finite state machine and a present state of the finite state machine, and
   wherein the present state of the finite state machine and the selected subset of the received input values define the inputs to the memory device.

6. The signal processing element of claim 5, wherein the outputs of the memory device include at least one bit supplied to the multiplexer for selecting said subset of the received input values.

7. The signal processing element of claim 5, further comprising a second memory device configured to receive the present state of the finite state machine as an input, and configured to supply an output based on the input, wherein the output of the second memory device is supplied to the multiplexer for selecting said subset of the received input values.

8. The signal processing element of claim 5, wherein the finite state machine further comprises a state register for storing the present state of the finite state machine.

* * * * *